US008216472B2

United States Patent
Cord-Ruwisch et al.

(10) Patent No.: US 8,216,472 B2
(45) Date of Patent: Jul. 10, 2012

(54) BIOLOGICAL NITROGEN REMOVAL

(75) Inventors: Ralf Cord-Ruwisch, Yangebup (AU);
Leonie J. Hughes, East Victoria Park (AU)

(73) Assignee: Murdoch University, Murdoch (AU)

( * ) Notice: Subject to any disclaimer, the term of this patent is extended or adjusted under 35 U.S.C. 154(b) by 0 days.

(21) Appl. No.: 12/811,476

(22) PCT Filed: Dec. 19, 2008

(86) PCT No.: PCT/AU2008/001886
§ 371 (c)(1),
(2), (4) Date: Oct. 4, 2010

(87) PCT Pub. No.: WO2009/086584
PCT Pub. Date: Jul. 16, 2009

(65) Prior Publication Data
US 2011/0011800 A1 Jan. 20, 2011

(30) Foreign Application Priority Data
Jan. 4, 2008 (AU) ............................ 2008900044

(51) Int. Cl.
*C02F 3/00* (2006.01)
(52) U.S. Cl. .................................. 210/607; 210/252
(58) Field of Classification Search .............. 210/607, 210/252
See application file for complete search history.

(56) References Cited

U.S. PATENT DOCUMENTS

| 5,863,433 | A * | 1/1999 | Behrends .................... 210/602 |
| 6,254,778 | B1 * | 7/2001 | Chudoba et al. ............ 210/614 |
| 6,485,645 | B1 | 11/2002 | Husain et al. |
| 2003/0015469 | A1 | 1/2003 | Hedenland et al. |

OTHER PUBLICATIONS

Third et al., Simultaneous nitrification and denitrification using stored substrate (PHB) as the electron donor in an SBR, *Biotechnol. Bioeng.*, 83(6): 706-20 (2003).
Third et al., The effect of dissolved oxygen on PHB accumulation in activated sludge cultures, *Biotechnol. Bioeng.*, 82(2): 238-50 (2003).
Zeng et al., Enrichment of denitrifying glycogen-accumulating organisms in anaerobic/anoxic activated sludge system, *Biotechnol. Bioeng.*, 81(4): 397-404 (2003).
International Search Report and Written Opinion of the International Searching Authority, Australian Patent Office, PCT/AU2008/001886, dated Feb. 3, 2009.
International Preliminary Report on Patentability, PCT/AU2008/001886, dated Jul. 6, 2010.

* cited by examiner

*Primary Examiner* — Chester Barry
(74) *Attorney, Agent, or Firm* — Marshall, Gerstein & Borun LLP

(57) ABSTRACT

The present invention relates to a method of treating a liquid to extract at least one of carbon, sulphur, nitrogen or phosphate from liquids such as waste water. Preferably, the invention is employed to remove nitrogen from waste water. In an alternate for the invention provides a wastewater treatment system.

16 Claims, 3 Drawing Sheets

BIOLOGICAL NITROGEN REMOVAL

This application claims priority from Australian Provisional Patent Application No. 2008900044 filed 4 Jan. 2008, the entire contents of which are incorporated herein by this reference.

FIELD OF THE INVENTION

The present invention relates to a method of treating a liquid to extract at least one of carbon, sulphur, nitrogen or phosphate from liquids such as waste water. Preferably, the invention is employed to remove nitrogen from waste water. In an alternate for the invention provides a wastewater treatment system.

BACKGROUND ART

1. Nitrification and Denitrification with the Same Biomass

Biological nitrogen removal (BNR) is an important part of wastewater treatment and consists of two separate biological processes, nitrification and denitrification. These two processes have mutually exclusive requirements.

Nitrification is performed under aerobic conditions by slow-growing autotrophic nitrifying bacteria, using oxygen to convert ammonia to nitrite and then to nitrate. In contrast, denitrification is performed by heterotrophic bacteria that require anoxic conditions and a source of electrons, typically organic material (Chemical Omen Demand, COD) to convert nitrate into, nitrogen gas. The electrons are usually provided in the form of oxidisable organic and inorganic compounds in the wastewater.

A prime disadvantage of a single biomass is that the oxygen supply for nitrification generally causes the oxidation of some of the COD. As denitrification relies on COD as a source of electrons, electron donors often limit denitrification and additional donors must be added to the wastewater to compensate, adding to the cost of treatment. In addition, the slow growth rates of nitrifying bacteria render it difficult to maintain a sufficient proportion of nitrifying bacteria in a mixed microbial population. Lower numbers of nitrifying bacteria slow down the overall process substantially. Furthermore, high levels of organic matter and solids in wastewater lead to wash out of autotrophic nitrifiers. Some technologies with a single biomass use low oxygen concentrations to enable nitrification and denitrification to occur at the same time (simultaneous nitrification and denitrification). However this technology compromises both nitrification (inadequate oxygen supply) and denitrification (too much oxygen supply). It requires precise process control, which is difficult to establish because of the large diurnal fluctuations in wastewater flow. The above compromise exerts stresses on the nitrogen metabolism and has been suspected to cause problems by emitting N2O as an undesired greenhouse gas.

2. Separated Biomass (Dual Biomass)

The mutually excluding requirements for nitrification and denitrification have lead to attempts to separate the nitrifiers from the denitrifiers. The advantages of separating nitrifying and denitrifying biomasses for nutrient removal in wastewater treatment are numerous. Principal among these is the ability to customise the delivery of electron acceptors (such as oxygen and nitrate) and donors (such as ammonia and COD) specifically as required. This separation allows for optimised growth and performance of nitrifiers and denitrifiers with minimal waste of both oxygen and carbon sources, since the aerobic oxidation of carbon is avoided, helping to limit undesired biomass sludge formation. Separated biomass systems using entirely sequential operations of anoxic storage, aerobic nitrification and anoxic denitrification have been developed. However, these systems are limited in performance and cost by several intrinsic technical problems.

Nitrification reactors, regardless of design (trickling filter or sequencing batch reactor) produce a detrimental drop in pH, leading to a reduction in the activity of nitrifying bacteria. The continual need for pH control is known to be a significant cost factor in wastewater treatment.

Multireactor systems or sequentially operated dual biomass systems separate the nitrification biomass from the denitrification biomass. As a result, they require a holding tank to prevent mixing of the partially treated wastewaters between reactors, thus increasing their space requirements or "footprint". The denitrifying biomass can be referred to as comprising a storage driven denitrification reactor, wherein the denitrifying biomass converts carbon to polymeric storage products to act as an energy store to fuel conversion of nitrates to gaseous nitrogen. Sequentially operated dual biomass systems are limited by the demonstrated physical retention of ammonia in the storage driven denitrification reactor during acetate uptake, which causes the release of untreated ammonia in the final reactor effluent from the denitrification phase. This is a major physical limitation to nitrogen removal efficiency such a system is able to accomplish, restricting it to a maximum nitrogen removal efficiency that corresponds to the amount of liquid that is retained in the biomass sludge after separation of bulk liquid from biomass. Accordingly traditional sludge settling with 50% settled sludge volume allows removal of only 50% of the nitrogen, whereas use of a sequential storage driven denitrification biofilm can allow about 80% nitrogen removal. To reduce ammonia retention, backwashing between the acetate (COD) uptake and denitrification phases can be used. This releases ammonia for treatment by the nitrification reactor. Such additional liquid flow may require additional holding tanks and increase the overall cast of operation.

It can be seen that the current waste treatment methods suffer from at least three main problems, namely pH drift, holding tank requirements and poor nitrogen removal capacity due to ammonia retention. The present invention addresses a need in the art for novel methods of removing nitrogen from liquids such as waste water.

The above discussion of the background art is intended to facilitate an understanding of the present invention only. The discussion is not an acknowledgement or admission that any of the material referred to is or was part of the common general knowledge as at the priority date of the application.

SUMMARY OF THE INVENTION

The present invention provides a method of treating liquid comprising the steps of:
 (a) introducing the liquid into a first reactor comprising a first biomass;
 (b) allowing the liquid to remain in the first reactor for a first period of time;
 (c) allowing the liquid from step (b) to circulate from the first reactor into a second reactor comprising a second biomass and from the second reactor into the first reactor in a continuous flow;
 (d) removing the liquid from the first reactor and/or the second reactor after a second period of time
wherein the liquid is retained solely in the first, reactor during the first period of time and wherein the flow of liquid during the second period of time is not accompanied by a corresponding flow of biomass.

In one embodiment of the invention, the liquid is wastewater.

In a second embodiment, the first and second biomasses are selected to extract at least one of carbon, sulphur, nitrogen or phosphate. Preferably, the biomasses are selected to remove at least nitrogen from the liquid. In a more preferable form the first biomass is selected to either nitrify or denitrify a liquid. Selection of the second biomass in this form of the invention is determined as the reciprocal activity of the first biomass.

In a third embodiment, the first and or second biomass is present in the reactor as a biofilm.

In a fourth embodiment, the first biomass converts organic matter in the wastewater to polymeric storage products over a first period of time.

According to a second aspect of the invention there is presented a wastewater treatment system comprising:
 (a) a first reactor comprising a first biomass;
 (b) a second reactor comprising a second biomass;
 (c) a means for introducing wastewater into the first reactor;
 (d) a controllable means for allowing the wastewater from the first reactor to move into the second reactor;
 (e) a controllable means for allowing the wastewater from the second reactor to move into the first reactor;
 (f) a means for removing wastewater from the first and/or second reactor
wherein the wastewater in the first reactor is in controllable communication with the wastewater in the second reactor and wherein the biomass in the first reactor is physically separated from the biomass in the second reactor.

In addition, the present invention provides a wastewater treatment system comprising:
 (a) a first reactor comprising a first biomass in the form of a biofilm;
 (b) a second reactor comprising a second biomass in the form of a biofilm;
 (c) a means for introducing wastewater into the first reactor;
 (d) a controllable means for allowing the wastewater from the first reactor to move into the second reactor;
 (e) a controllable a means for allowing the wastewater from the second reactor to move into the first reactor;
 (f) a means for removing wastewater from the first and/or second reactor
 (g) a means that allows liquid to move simultaneously from the first to second and from second to first reactor
wherein the wastewater in the first reactor is in controllable communication with the wastewater in the second reactor and wherein the biomass in the first reactor is physically separated from the biomass in the second reactor at all times.

Where the invention is presented as a wastewater treatment system, any one or more of the aforementioned first, second, third or fourth embodiments of the invention may be employed in the system of wastewater treatment.

Other aspects and advantages of the invention will become apparent to those skilled in the art from a review of the ensuing description, which proceeds with reference to the following illustrative drawings.

DISCLOSURE OF THE INVENTION

General

Figure 1:
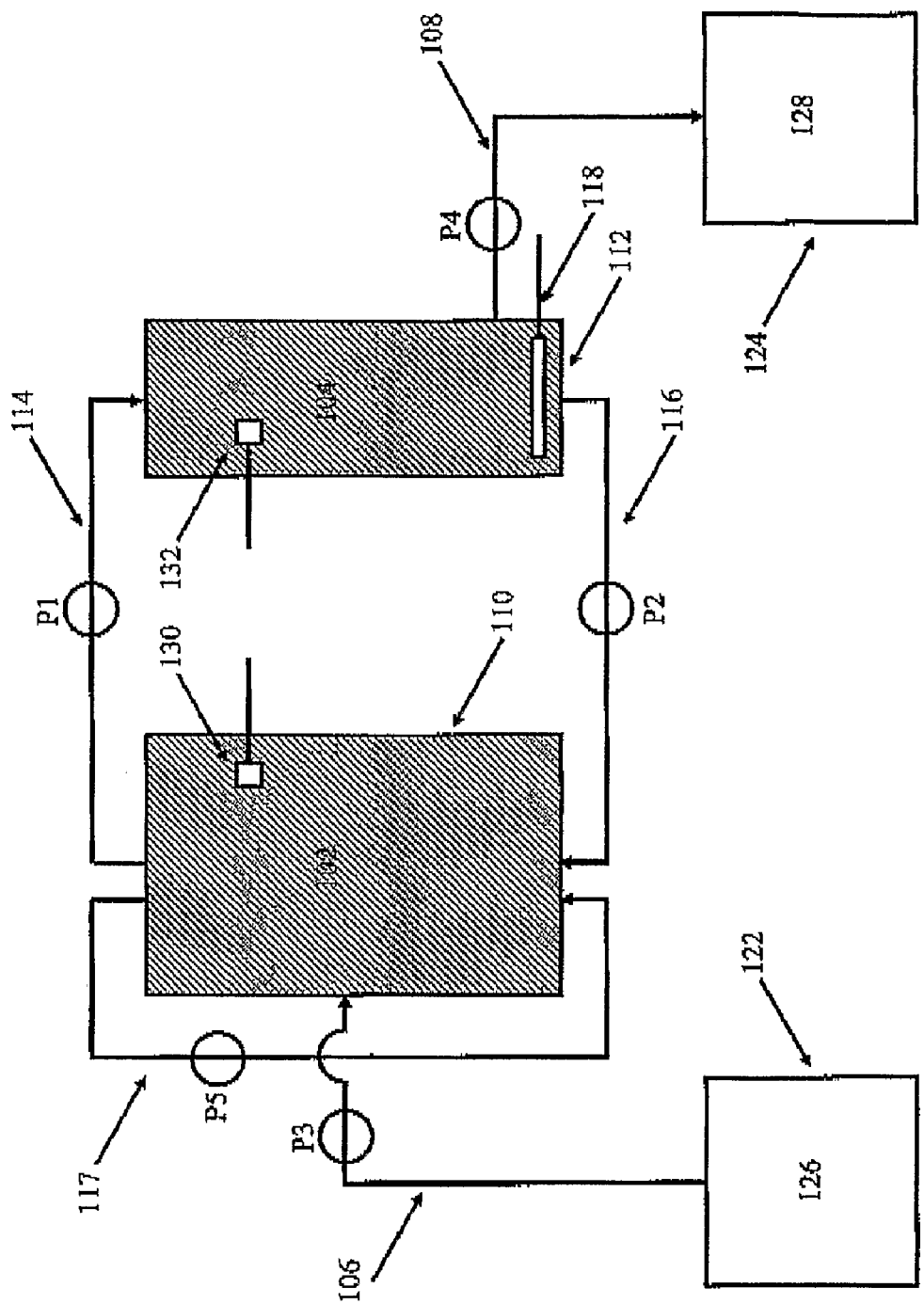
FIG. 1 is a drawing to illustrate a wastewater treatment system according to one aspect of the present invention.

Those skilled in the art will appreciate that the invention described herein is susceptible to variations and modifications other than those specifically described. It is to be understood that the invention includes all such variation and modifications. The invention also includes all of the steps, features, compositions and compounds referred to or indicated in the specification, individually or collectively and any and all combinations or any two or more of the steps or features.

The entire disclosures of all publications (including patents, patent applications, journal articles, laboratory manuals, books, or other documents) cited herein is expressly incorporated herein by reference, which means that it should be read and considered by the reader as part of this text. That the document, reference, patent application or patent cited in this text is not repeated in this text is merely for reasons of conciseness. No admission is made that any of the references constitute prior art or are part of the common general knowledge of those working in the field to which this invention relates.

The present invention is not to be limited in scope by the specific embodiments described herein, which are intended for the purpose of exemplification only. Functionally equivalent products, compositions and methods are clearly within the scope of the invention as described herein.

As used herein the term "derived" and "derived from" shall be taken to indicate that a specific integer may be obtained from a particular source albeit not necessarily directly from that source.

As used herein the phrase "COD" will be understood to include the phrase biochemical oxygen demand (BOD). Each phrase may be interchangeably used throughout this document.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

DETAILED DESCRIPTION

It has been found that a parallel nitrification-denitrification system, wherein the process of nitrification and denitrification are performed simultaneously by physically separated biomasses allows the removal of nitrogen from a liquid, such as but not exclusively limited to a wastewater, in an effective manner.

The present invention thus provides a method of treating a liquid comprising the steps of:
 (a) introducing the liquid into a first reactor comprising a first biomass;
 (b) allowing the liquid to remain in the first reactor for a first period of time;
 (c) allowing the liquid from step (b) to circulate from the first reactor into a second reactor comprising a second biomass and from the second reactor into the first reactor in a continuous flow;
 (d) removing the liquid from the first reactor and/or the second reactor after a second period of time
wherein the liquid is retained solely in the first reactor during the first period of time and wherein the flow of liquid during the second period of time is not accompanied by a corresponding flow of biomass.

The "liquid" employed in the method is preferably a liquid product from agricultural, mining (alumina, gold, nickel processing), food processing or beverage (brewing and winery) or other production industries releasing aqueous waste. In an embodiment of the invention, the liquid is wastewater. The following description expounds on the invention in terms of its use in the treatment of wastewater. The invention is not however limited only in this context. A person of skill reading this application will and should recognise and understand that a wide varieties of liquids may be employed in the method of the invention without departing from the employed methodology.

Thus, according to the identified embodiment of the invention there is provided a method for treating wastewater comprising the steps of:
 (a) introducing a wastewater into a first reactor comprising a first biomass;
 (b) allowing the wastewater to remain in the first reactor for a first period of time;
 (c) allowing the wastewater from step (b) to circulate from the first reactor into a second reactor comprising a second biomass and from the second reactor into the first reactor in a continuous flow;
 (d) removing the wastewater from the first reactor and/or the second reactor after a second period of time
wherein the wastewater is retained solely in the first reactor during the first period of time and wherein the flow of wastewater during the second period of time is not accompanied by a corresponding flow of biomass.

In a second embodiment, the first and second biomasses are selected to extract at least one of carbon, sulphur, nitrogen or phosphate. Preferably, the biomasses are selected to remove at least nitrogen from the liquid. In a more preferable form the first biomass is selected to either nitrify or denitrify a liquid. Selection of the second biomass in this form of the invention is determined as the reciprocal activity of the first biomass.

By circulating the wastewater through the first and second reactor without a concomitant flow of biomass, the efficiency of removal of nitrogen (and potentially other compounds such as phosphate and carbon) from the wastewater may be increased over previous methods, as the organisms comprising the anaerobic biomass in the first reactor are not diluted or out-competed by introduction of organisms comprising the aerobic biomass from the second reactor, and vice versa. Furthermore, by circulating wastewater but not biomass, many of the problems associated with pH stabilisation have been overcome, and an improvement in oxygen use efficiency and a reduction in loss of organic carbon is achieved.

Whilst it is preferable that no biomass transfer at all accompanies the flow of wastewater, it is anticipated that there may be some small transfer. However, preferably the amount of biomass transfer is so small that the nitrification bioreactor does not contain significant amounts of heterotrophic bacteria which could oxidise any residual organic material (COD) by using oxygen. In comparison to traditional sequential tanks of nitrification and denitrification, where most or all of the biomass is transferred with the wastewater, the present system preferably transfers less than 10% of the biomass from one reactor to the next preferentially with less than 1% and ideally with no biomass next, transfer at all. Most preferably, the present invention provides a wastewater treatment method wherein the technique of separated biomasses avoids the presence of dissolved oxygen in the wastewater at the time that significant COD is still present in the wastewater.

The term "wastewater" as used herein refers to a mixture of water and dissolved or suspended solids. It is generally water, derived from residential, business or industrial sources, which may contain a variety of waste products such as soap, carbohydrates, lipids, proteins, ammonia, chemicals or manure. It may be derived from a wide variety of sources, for example effluent from agricultural sources such as animal farming practices including piggeries, aquaculture sources, poultry farms and dairy farms. Industrial wastewater and effluent from sources such as paper and pulp mills, sugar refineries, abattoirs, food processing and manufacturing industries, effluent from the tanning industry, the defence industry (e.g. munitions production), the food industry, the agriculture industry, the chemical industry (e.g. manufacturing of fertilizers) and mining may be treated using the present method. Effluent from human sources such as sewerage facilities, communal wastewater, and domestic grey and black water is also included within the meaning of the term. Storm water, surface water, and groundwater infiltration, particularly if it is contaminated by organic, nitrogen containing or chemical substances, may also fall within the meaning of the term wastewater. Preferably, the wastewater to be treated using the method of the present invention is wastewater derived from a municipal wastewater treatment facility, such as sewage. It is contemplated that the methods of the present invention are suitable for removal of nitrogenous matter, carbonaceous matter, phosphorous, and/or mixtures thereof from aqueous waste generated by, for example, domestic, agricultural, mining or industrial processes. Wastewater can also include natural or modified water bodies such as aquifers, lakes, ponds, pools, lagoons, rivers or run-offs and leachates from material that is in contact with water, as long as it contains ammonia, or other nitrogen substances and organic compounds.

The term "treating" as used herein refers to the partial or total removal of at least nitrogen from the wastewater. The nitrogen may initially be in the form of organic nitrogenous compounds, ammonia, nitrates or other forms of nitrogen such as amino acids or proteins. Preferably, at least 50% of the total nitrogen in the wastewater is removed after the wastewater has circulated between the first and second, reactors. More preferably, greater than 60%, 70% or 80% of the nitrogen is removed. Most preferably, greater than 90% or greater than 99% of the nitrogen is removed.

In the literature, it is established that $N_2O$ is produced as an undesired by-product during oxygen limiting conditions under which both nitrification and denitrification can occur. Whilst it is not entirely clear from the current literature whether the $N_2O$ is formed during an incomplete denitrification reaction that is inhibited by the presence of oxygen, or whether it is mainly produced during oxygen limited nitrification, it is clear that conditions that aim at optimum nitrogen removal via simultaneous nitrification and denitrification (SND) cause this $N_2O$ emission. In the present method, $N_2O$ production due to the above described oxygen inhibition of denitrification and oxygen limitation of nitrification is not expected to occur, as the nitrification reactor is supplied with saturating oxygen concentrations, while the denitrification reactor can be kept oxygen free or at the least substantially oxygen free.

It is further preferred that the wastewater treatment method of the present invention reduce the amount of carbonaceous matter in the outflow to no less than approximately 50% of the original amount of carbonaceous matter. It is more preferred for the amount to be reduced by no less than approximately 90%.

In addition to nitrogen removal, phosphorous and sulphur removal from the wastewater is also contemplated. Phosphate removal by use of the present method is based on the capacity of the storage driven denitrification biomass to release phosphate during the uptake of organic material, and to take up phosphate during the denitrification step. This allows the timing of treated effluent removal to occur at a time when both nitrogen and phosphate are at their lowest levels, a feature that is not normally obtained in biological phosphate removal systems.

The wastewater treatment system of the present invention is particularly suited to assist in the treatment of waste streams with high nitrogen content such as piggery waste where ammonia can be as high as 500 mg $L^{-1}$. However, it can also be used to treat waste water low concentrations of nitrogen, such as groundwater.

The first and second reactors of the present method may be physically separated into two separate vessels, or may be formed into one vessel with a physical barrier separating the biomass of the two reactors. The reactors may contain either suspended biomass cultures or biofilms, or a combination of the two. For example, the following combinations are contemplated:

(a) a first reactor comprising a suspended culture biomass and a second reactor comprising a suspended culture biomass;

(b) a first reactor comprising a suspended culture biomass and a second reactor comprising a biofilm biomass;

(c) a first reactor comprising a biofilm biomass and a second reactor comprising a suspended culture biomass; or (d) a first reactor comprising a biofilm biomass and a second reactor comprising a biofilm biomass.

Wastewater can be circulated between suspended culture biomass by, for example, the use of membrane technology wherein the wastewater may pass between the two reactors separated by a membrane or filter that allows water flow but little or no concomitant movement of biomass. Alternatively, the suspended biomasses may be retained in their separate reactors by the use of gravity related retention—e.g. by the use of up flow sludge blanket reactors wherein the slow up flow of liquid keeps the biomass suspended but is slow enough to allow gravity sedimentation to retain the biomass in each separate reactor. Alternatively, the biomass could also be separated from the liquid flow and retained in its own reactor by using traditional gravity separation (settler) or by centrifuging. If the biomass in both reactors is suspended no further physical barrier may be needed.

During the storage of acetate phase, the first reactor in the method of the present invention is preferably maintained in a substantially anoxic or anaerobic state during the first time period, to allow the biomass to convert carbon in the wastewater to polymeric storage products rather than oxidising it. Reference to "substantially anoxic or anaerobic" does not mean that the entry of oxygen must be completely avoided. Some oxygen entry, for example during drainage of a submersed biofilm or from the incoming wastewater, can be tolerated. Preferably, during continuous operation the oxygen levels in the first reactor are less than about 1 mg/L, more preferably less than about 0.1 mg/L and most preferably it cannot be detected with traditional oxygen electrodes as any inadvertent or deliberate (not normally) oxygen is consumed.

In the absence of any suitable electron acceptor for respiration and energy (ATP) generation such as oxygen, nitrate or nitrite, a different metabolic model can operate for acetate storage, for example the fermentation of accumulated glycogen or similar to produce energy for organic carbon uptake for storage or degradation of accumulated polyphosphate.

In order to assist in the energy supply for effective storage of COD, some residual drainage water from a suitable nitrification reactor (e.g. in the case of several PND reactor systems from the nitrification reactor of a sister system), containing nitrate or nitrite can be added during the storage phase of the first reactor.

All three mechanisms (anoxic using nitrate or nitrite, aerobic using oxygen and anaerobic using phosphate or glycogen) perform some part in the carbon uptake performance of the reactor during the first time period. Thus, carbon uptake happens either aerobically (with very limited oxygen supply), anoxically (with limited oxidised nitrogen supply) or anaerobically (with a release of phosphate or fermentation of glycogen) or a combination of the three.

A substantially anoxic or anaerobic state may be achieved by maintaining the first reactor in a liquid locked state, i.e. filling the first reactor entirely with wastewater such that substantially all atmospheric oxygen is excluded. However, other methods known to the skilled person of reducing or eliminating oxygen from the reactor are contemplated.

Preferably, the first reactor is maintained in a substantially anoxic state during the second period of time (denitrification). Maintenance of the first biomass in the first reactor in a substantially anoxic state during the second period of time, when the wastewater is circulating between the first and second reactors, allows the first biomass to convert the either or both nitrate and nitrite in the wastewater to gaseous nitrogen in the absence of excess oxygen and by using the stored organic material as an electron donor for denitrification. The wastewater introduced from the second reactor into the first reactor during the second period of time is preferably substantially free of oxygen. This may be achieved by controlling the oxygen supply in the nitrification reactor.

As an alternative to the fully aerobic nitrification reactor a hybrid reactor could be used that employs aerobic nitrifying bacteria and anaerobic ammonium oxidising bacteria (AN-AMMOX). In the first zone (the top zone of a down flow trickling reactor) traditional nitrifying bacteria will develop due to the presence of ammonia and oxygen. Under suitable conditions (oxygen, pH, temperature, ammonium) the process can be steered to only partial ammonia oxidation to nitrite (Nitrosomonas) within this aerobic zone, housing fixed film aerobic nitrifying bacteria, resulting in the accumulation of nitrite in the subsequent anoxic zone (e.g. submersed, bottom part of the reactor). The presence, of undegraded ammonia and freshly produced nitrite in this anoxic zone are the enrichment conditions for ANAMMOX. The ANAMMOX reaction converts ammonium as the electron donor and nitrite as the electron acceptor into N2. By using this double layer reactor in place of the purely aerobic nitrification reactor would further enable effective nitrogen removal. The possibility of combining partly aerobic nitrification with the anaerobic ANAMMOX reaction, also described as the Completely Autrotrophic Nitrogen Removal Over Nitrite (CANON), is merely one alternative for the nitrification step shown here. However, some nitrite or nitrate should be still in the outflow of the nitrification reactor such that the storage driven denitrification process can continue to operate.

The second reactor in the method of the present invention is preferably maintained in a substantially oxygenated state. It is preferred that the oxygen levels in the solution of the second reactor are more than about 0.1 mg/L, more preferably more than about 1 mg/L, most preferably more than about 4 mg/L. During the second period of time, when the wastewater is circulating between the first and second reactor, the second biomass in the second reactor converts ammonia to nitrite and possibly nitrate, which requires an oxygenated environment.

The second reactor may be aerated by continuous oxygen or air flow during the second time period. The first time period should be of sufficient duration to allow the first biomass to convert substantially most or all of the carbon in the wastewater to polymeric storage products. The advantage of this is that when no COD is carried through to the second nitrification reactor during the second period of time, this allows all the oxygen in the nitrification reactor to be used by the nitrifying bacteria to convert ammonia to nitrates/nitrites, rather than to degrade COD. In addition the polymeric storage products can then be used by the denitrifying bacteria as an energy source for converting nitrates/nitrites to nitrogen gas in the third time period.

Desirably, the first period of time is at least 15 minutes. More preferably, the first time period is at least 60 minutes. Most preferably, the first time period is 120 minutes or more. For example, for a certain biomass and organic pollutant concentration, it has been shown that after 60 minutes, there is >68% COD removal; after 90 minutes, >89% COD removal can be achieved; and after 120 minutes, >96% COD removal can be achieved using the present method.

The second time period, wherein the wastewater is circulated between the first and second reactors without a corresponding flow of biomass, should be of sufficient duration to allow the second biomass in the second bioreactor to convert most or substantially all the ammonia in the wastewater to nitrate or nitrite and the first biomass in the first reactor to convert substantially all the nitrate or nitrite to nitrogen gas. Preferably, the second period of time is at least 15 minutes. More preferably, the second time period is at least 100 minutes. Most preferably, the second time period is at least 240 minutes. For example, for a certain biomass and nitrogen pollutant concentration it has been shown that the present method can convert >60% total N (not merely $NH_3$ or $NO_3^-$) after 100 minutes; conversion of >85% N can be achieved after 150 minutes and >94% N can be converted after 240 minutes.

During the second period of time, the wastewater is circulated continuously between the first and second reactors. Preferably, there is an up flow in the denitrification reactor to keep it free of atmospheric oxygen and a trickle down flow in the nitrification reactor to expose the liquor to atmospheric oxygen. A person skilled in the art will recognise that other means of achieving these different oxygen environments are possible though. For example, the flows may be both up or both downwards—having one of each will save on pumping costs as the up flow from one can then feed the down flow of the other using gravity to assist rather than pumping.

Preferably, pumps are used to achieve liquid flow. For example, when using biofilms in both reactors, the wastewater may be circulated from the upper portion of the first reactor to the upper portion of the second reactor, and from the lower portion of the second reactor to the lower portion of the first reactor. This results in a liquid flow direction that is substantially upwards through the first reactor and downwards through the second reactor.

Once the wastewater has circulated through the first and second reactors for a sufficient period of time to allow the second biomass in the second bioreactor to convert most or substantially all the ammonia in the wastewater to nitrate or nitrite and the first biomass in the first reactor to convert substantially all the nitrate or nitrite to nitrogen gas, the wastewater (which may now be termed "treated effluent"), can be removed from the wastewater treatment system. The treated effluent may be removed from either the first or the second reactor or both. Preferably, it is removed from the second reactor via an outlet port to an effluent holding tank.

In operation, the pH of the first and second reactors should be maintained at a level that ensures viability of the organisms employed. In this respect, many nitrifiers are inhibited by reduced pH (increasing acid concentration). Contrast this with denitrifiers which increase the pH (increase either hydroxide concentration or reduce acid concentration). Both classes of organisms are affected by low pH with pHs below 6 often causing serious loss of activity for both.

To ensure efficiency of operation of the reactor, the pH in the nitrification reactor is preferably above 6. Relative to a pH of 7 and depending on the organism selected in the different nitrification/denitrification reactions, a 50% reduction in efficiency can be observed at a pH of 6. A 20% activity loss will be observed by reducing pH to 6.5. Preferably, the pH is kept above 7, most preferably above 7.3.

If the pH in the nitrification reaction is above 7 at the commencement of operation, monitoring of pH will provide a means for detecting when circulation or exchange of the liquids should take place. That is, if the pH falls below the minimum desired pH then the fluid should be more readily circulated between the two reactors to maintain a pH balance.

The pH in the denitrification reactor ideally needs to also be above 7 but the denitrifiers will increase the pH and therefore the same sorts of constraints as on the nitrifiers wouldn't be necessary. That noted, once the pH rises to a level acceptable to the nitrifiers then another exchange of liquid can be initiated. Preferably, the pH in both reaction vessels is maintained in the range 6.5 to 8. More preferably that range is between 7 and 7.5, inclusive of all pHs within that range.

By operating the reactors in a continuous or nearly continuous nature of recirculation, defined by pH variance wastewater can be circulated from the environment where the pH is low to the high pH environment and the higher pH wastewater to the environment dropping pH in order to optimise the pH for the bacteria.

Preferably, the first biomass and/or the second biomass is provided as a biofilm. Biofilm based reactors may increase the biomass 'concentration' compared to a similar sized suspended culture reactor and hence may have lower footprint requirements. This is of particular interest with increasingly dense urban populations, as the volume of wastewater to be treated is high while the land available for treatment is low. Biofilms may also assist in the regulation of population characteristics, for example, the maintenance of a high level of nitrifiers without sludge bulking. The use of biofilms may also reduce the amount of wastewater liquor retained in comparison to suspended culture. Such retention can severely limit the treated effluent quality. In addition, the use of a biofilms may also eliminate the need for settling and clarification of treated wastewater. Even with the use of biofilms though, there will still be a need for periodic cleaning of biofilm growth to prevent clogging.

In the wastewater treatment method of the present invention, the biofilm biomass in the first and/or second reactor can be carried by a solid support, such as, for example, a biotower, a rotating biological contactor, rough stones, slats, plastic media, a reticulated foam particle, a microcarrier and/or media particles.

Thus, there is provided a method of treating wastewater comprising the steps of:
(a) introducing the wastewater into a first reactor comprising a first biomass in the form of a biofilm;
(b) allowing the wastewater to remain in the first reactor for a first period of time;
(c) allowing the wastewater from step (b) to circulate from the first reactor into a second reactor comprising a second biomass in the form of a biofilm and from the second reactor into the first reactor in a continuous flow;
(d) removing the wastewater from the first reactor and/or the second reactor after a second period of time
wherein the wastewater is retained solely in the first reactor during the first period of time and wherein the flow of wastewater during the second period of time is not accompanied by a corresponding flow of biomass.

Biofilm reactors are generally divided into fixed bed reactors and fluidized bed reactors. Moving bed reactors represent a hybrid. All these could be used for the current invention. There are a number of types of fixed bed processes which utilize solid supports, i.e., trickling filter, biotower and rotating biological contactor (RBC). In such settings, micro-organisms attach and live on the medium and take up the nutrients and other compounds from the wastewater flow passing by them. A trickling filter is a bed of coarse material (e.g., stones, slats and plastic media) that wastewater is passed through. Biotowers are also trickling filters, but in the shapes of high towers. An RBC uses flat disks, ranging in diameter from 2 to 4 m and up to 1 cm in thickness, as the solid support to attach micro-organisms. The disks are mounted on a common shaft that rotates at approximately 1 to 2 rpm. Trickling filters and biotowers are typical fixed-biofilm reactors, while a RBC is treated as a special adaptation of the attached-growth process.

A biological fluidized-bed (BFB) reactor is similar to the fixed bed reactors described above in also being a biofilm reactor. However, the difference between the fixed bed reactor and the fluidized-bed reactor is that the biofilm media of the latter are not fixed but fluidized by suitable liquid flow. The advantages of a fluidized-bed reactor over suspended-growth and attached-growth reactors include: high biomass concentrations and surface areas, less susceptibility to sudden changes in load or temperature, successful carbon and nitrogen removal from municipal wastewater, the elimination of any problems and costs caused by sludge, and less expense based on savings in reactor space and rapid treatment time. A fluidized-bed reactor is generally more efficient than a packed-column (attached-growth) reactor in terms of nitrate removal of per unit reactor volume.

The media of a BFB reactor is usually light weight and has a particle size of 0.2 to 1.0 mm. At the beginning of operating a BFB reactor, the particles are expanded in a column by an upward flow of wastewater recirculation to the point at which the upward force is equal to the downward gravity. However, as the bacteria grow as a biofilm around the particle, increasing biofilm volume will continue to expand the bed. Therefore, at the steady state, where cell growth equals the rate the cells are washed off by the surface sheer, the bed may be at an undesirable height. As a result, to remove the excess biomass, particles should be taken out of the reactor and washed routinely.

In a preferred embodiment, the biofilm biomass is provided in the form of a biological fluidized bed reactor wherein the biomass is carried by anionic and hydrophilic media particles, such as ceramic spheres, having a rough surface and with a diameter less than about 1 mm, less than about 0.8 mm, or more preferably, less than about 0.6 mm.

Alternatively, the first and/or second biomass may be provided as a suspended culture. Suspended culture biomasses are free of solid supports. The suspended biomasses may preferably be composed of organisms that flocculate to form granular biomasses, aiding in settling of the suspended biomasses. In a suspended culture reactor, the micro-organisms in the biomass and the wastewater are mixed. The mixture is usually agitated, and, under such conditions, growth of micro-organisms is stimulated. The individual organisms gradually flocculate and form an active mass of microbes known as activated sludge.

The first biomass may be composed of any population of micro-organisms that are able to perform denitrification of the wastewater being treated, i.e. the conversion of oxidised nitrogen to a gaseous end product. For example, the biomass may be composed of microbes such as bacteria, fungi and archaea. Preferably, the biomass is composed principally of bacteria. The 'classic' would be *Pseudomonas denitriticans* but many other species within the Pseudomonads and other genera may be employed in the reactor such as *Aquaspirillium, Agrobacteria, Chromobacteria, Neisseria Bacilli, Thiobacilli*. The preferred bacteria are those that are capable of converting carbon into polymeric storage products and converting nitrate into nitrogen gas. However, any microbe that is capable of denitrifying wastewater may be used.

The second biomass may be composed of any population of micro-organisms that are able to perform nitrification of the wastewater being treated, i.e. that are able to convert ammonia to nitrate. For example, the biomass may be composed of microbes such as bacteria, fungi and archaea. Preferably, the biomass is composed principally of bacteria. Any microbe that is capable of nitrifying wastewater may be used. Preferably, the second biomass comprises bacteria of the genus *Nitrobacter* and *Nitrosomonas* and *Nitrospria*. *Nitro-*

*bacter* performs nitrite oxidation while *Nitrosomonas* performs ammonia oxidation. In a highly preferred state of the invention, the PND reactor would preferably support only the Nitrosomonads so that there is a saving in both oxygen and COD due to nitrite rather than nitrate being the principle chemical shared between the reactors.

There is further provided a method of treating wastewater comprising the steps of:
- (a) introducing the wastewater into a first reactor comprising a first biomass;
- (b) allowing the first biomass to convert organic matter in the wastewater to polymeric storage products over a first period of time;
- (c) allowing the wastewater from *step (b) to circulate from the first reactor into a second reactor comprising a second biomass and from the second reactor into the first reactor in a continuous flow;
- (d) removing the wastewater from the first reactor and/or the second reactor after a second period of time wherein the wastewater is retained solely in the first reactor during the first period of time and wherein the flow of wastewater during the second period of time is not accompanied by a corresponding flow of biomass.

Generally, there are three main types of storage compounds which are generated by bacteria during the conversion of organic matter into polymeric storage products in step (b) of the above method. These are glycogen, polyphosphate and poly hydroxyalkanoates (PHA) such as poly hydroxybutryic acid (PHB). Preferably, the polymeric storage product is poly hydroxybutryic acid. The oxygen concentration in the first reactor during the first time period may be limited in order to induce unbalanced growth conditions encouraging PHB storage. For example, an oxygen concentration of around 0.05 mg/l can be used. However, an oxygen concentration of 1 mg/l may still yield relatively high storage of carbon is polymeric storage products in the method of the present invention. Most preferably, the dissolved oxygen concentration during the first time period is 0 mg/l.

The present invention also provides a wastewater treatment system comprising:
- (a) a first reactor comprising a first biomass;
- (b) a second reactor comprising a second biomass;
- (c) a means for introducing wastewater into the first reactor;
- (d) a controllable means for allowing the wastewater from the first reactor to move into the second reactor;
- (e) a controllable a means for allowing the wastewater from the second reactor to move into the first reactor;
- (f) a means for removing wastewater from the first and/or second reactor wherein the wastewater in the first reactor is in controllable communication with the wastewater in the second reactor and wherein the biomass in the first reactor is physically separated from the biomass in the second reactor.

In addition, the present invention provides a wastewater treatment system comprising:
- (a) a first reactor comprising a first biomass in the form of a biofilm;
- (b) a second reactor comprising a second biomass in the form of a biofilm;
- (c) a means for introducing wastewater into the first reactor;
- (d) a controllable means for allowing the wastewater from the first reactor to move into the second reactor;
- (e) a controllable a means for allowing the wastewater from the second reactor to move into the first reactor;
- (f) a means for removing wastewater from the first and/or second reactor wherein the wastewater in the first reactor is in controllable communication with the wastewater in the second reactor and wherein the biomass in the first reactor is physically separated from the biomass in the second reactor at all times.

EXAMPLES

The following examples serve to more fully describe the manner of using the above-described invention, as well as to set forth the best modes contemplated for carrying out various aspects of the invention. This description is included solely for the purposes of exemplifying the present invention. It is understood that these methods in no way serve to limit the true scope of this invention, but rather are presented for illustrative purposes.

Example 1

FIG. 1 shows a wastewater treatment system, including a first reactor 110 containing anaerobic bacteria 102 and a second reactor 112 containing aerobic bacteria 104. An inlet port 106 is connected to the first reactor 110 and an outlet port 108 is connected to the second reactor 112. The wastewater treatment system also includes a first controllable transfer means 114 and a second controllable transfer means 116 which connect the first reactor 110 and the second reactor 112. In addition, the wastewater treatment system includes a recirculating means 117 which allows wastewater to be recirculated through the first reactor 110.

There is also provided an oxygenating means 118 for oxygenating the aerobic bacteria 104. The oxygenating means 118 may be a pump, an agitator, a blower (fan) and/or an air diffuser. However, it is contemplated that other oxygenating means known in the art are suitable for use with the wastewater treatment system of the present invention. For example, if the reactor is a trickling filter reactor, the aeration may be achieved by spraying the liquor into the headspace of the reactor. An air pump of fan can then be used to blow air into the head space. This can be at one (e.g. bottom) or many different inlets. This allows the liquid droplets to interact with the oxygen in the air of the headspace and therefore achieves dissolution of oxygen in the wastewater. Different existing trickle reactor systems may be adapted to become the second reactor of this invention.

The wastewater treatment system of the present invention includes an aqueous waste holding tank 122 for holding liquid wastewater prior to treatment 126 and/or an effluent collection tank 124 for collecting treated effluent 128 released from the second reactor 112. In other examples one or both of two tanks can be omitted. In this case the first reactor serves as the buffer tank for incoming wastewater.

The wastewater treatment system of the present invention may further include a first pump P1 for circulating the contents of the first reactor 110 to the second reactor 112 via the controllable transfer means 114 and/or a second pump P2 for circulating the contents of the second reactor 112 to the first reactor 110 via the controllable transfer means 116. The system may also have a third pump P3 to pump the untreated wastewater 126 from the holding tank 124 into the first reactor 110 and/or a fourth pump P4 to pump the treated wastewater 128 from the second reactor 112 to the effluent collecting tank 124. The system may also include a fifth pump P5 to recirculate the wastewater through the first reactor 110.

The wastewater treatment system may also include a means for measuring one or more of pH, oxygen, nitrogen, organic carbon and/or phosphate in the first reactor 110 and/or the second reactor 112, as represented by reference numerals 130 and/or 132 in FIG. 1.

Instead of just consisting of one PND system, comprising two reactors the PND system invented can be operated as several or many PND modules using smaller reactors. This would enable more flexibility with varying diurnal wastewater flow changes, by for example only using 2 out of 8 PND modules during low flow in the night while keeping the other either filled (anoxic) or empty or partly filled as desired. Further this modular set-up of several sister PND systems could enable the flow of nitrate/nitrite containing wastewater with the inflowing wastewater to treatment step one (COD storage)

It is contemplated that bacteria 102 and 104 in the wastewater treatment system may be carried by a solid support means, such as, for example rough stones, slats, plastic media, microcarriers, media particles, a biotower, or a rotating biological contactor. Alternatively, bacteria 102 and 104 may grow in suspension, free of solid support.

In general, the wastewater treatment system of the present invention operates as follows.

Untreated liquid waste 126 is pumped by pump P3 from waste holding tank 122 into the first reactor 110 via inlet port 106. The amount of wastewater provided is sufficient to entirely fill the first reactor 110. The wastewater interacts with the anaerobic bacteria 102 in the first reactor 110 for 120 minutes. This interaction is facilitated by recirculation of the wastewater through the first reactor 110 via recirculation means 117. Recirculation is generally in an upward direction, wherein the wastewater is recirculated by removing wastewater from the top of the first reactor 110 and re-introducing it to the bottom of the first reactor 110. Rather than just allowing an upflow an additional or largely horizontal flow can also be used. The wastewater flows over the anaerobic bacteria 102, wherein the anaerobic bacteria 102 convert the carbon in the wastewater to polymeric storage products, preferably PHB.

After 120 minutes, the wastewater is transferred from the first reactor 110 to the second reactor 112 and back via the first and second controllable transfer means 114 and 116, such that the wastewater recirculates between the first and second reactors 110 and 112 in a continuously flowing manner. The wastewater is introduced from the upper portion of the first reactor 110 to the upper portion of the second reactor 112 via the first controllable transfer means 114 and allowed to flow in a generally downward direction over the second biomass 104. The wastewater is recirculated from the lower portion of the second reactor 112 into the lower portion first reactor 110 via the second controllable transfer means 116. This flow is not accompanied by a corresponding flow of biomass. Preferably, the biomass is restrained in each reactor as the anaerobic bacteria 102 and aerobic bacteria 104 are immobilised on the solid support means. Preferably, the wastewater being recirculated from the lower portion of the second reactor 112 into the lower portion of the first reactor 110 is substantially free of oxygen, as the majority, or at least a substantial proportion, of the oxygen has been removed by the aerobic biomass 104 in the second reactor 112. This allows the first reactor to be maintained in an anoxic state during the second time period.

The wastewater is recirculated between the first and second reactors for 240 minutes. During this time, the wastewater in the first and/or second reactors (110 and/or 112) may be monitored for desirable levels of oxygen, organic carbon, nitrogen and/or phosphate, as well as pH. After 240 minutes, the nitrogen levels in the wastewater have been reduced to desirable levels. The wastewater is then removed from the second reactor via outlet port 108 as treated effluent 128 into effluent collection tank 124.

Example 2

Reactor Operation

Figure 2:
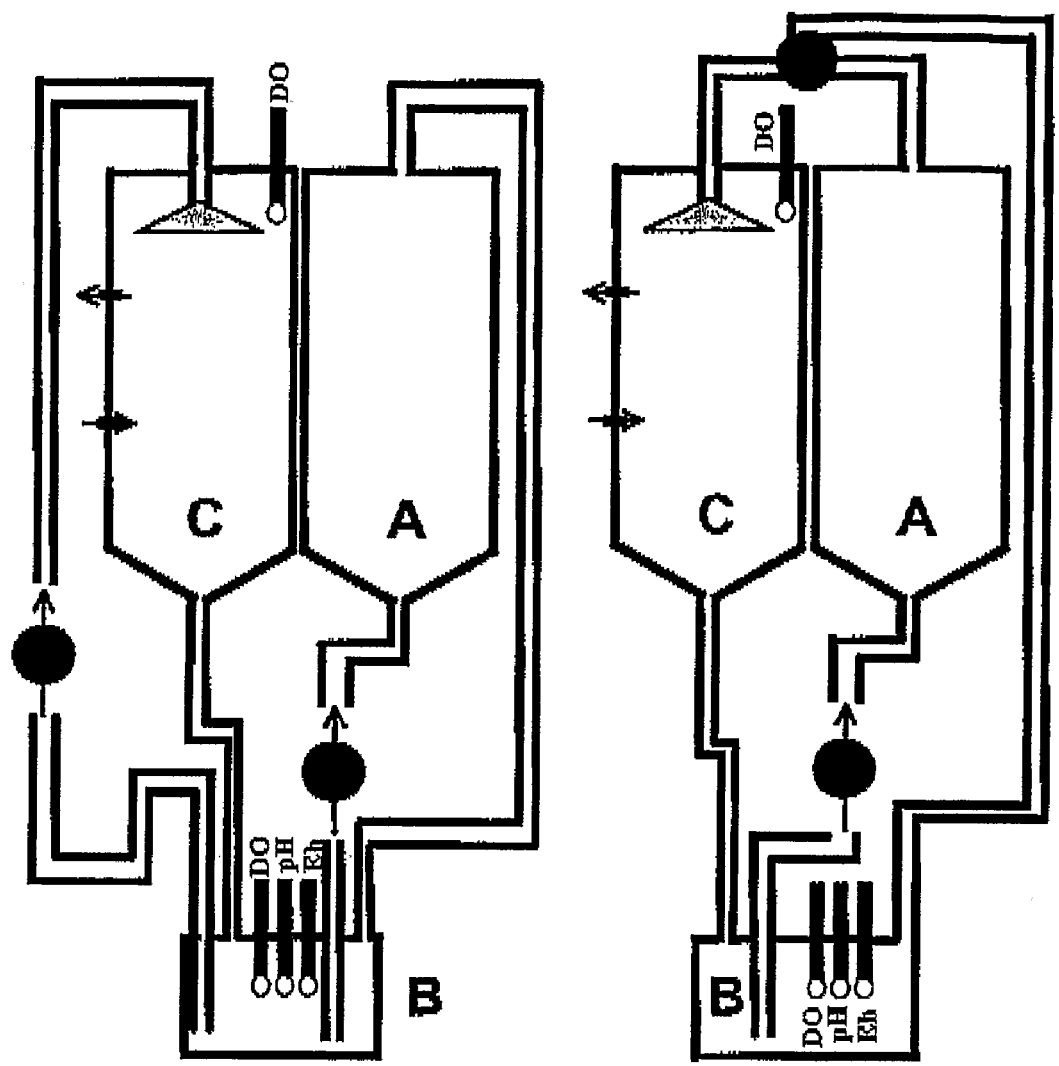
FIG. 2 is a drawing of a Parallel Nitrification Denitrification wastewater treatment system in accordance with one aspect of the present invention consisting of a storage driven denitrification reactor (A), a recycle vessel (B) and a nitrification reactor (C). The size of the recycle vessel can be kept relatively small as it is designed for brief mixing and to house process control sensors. It is fitted with probes for dissolved oxygen, pH and redox and the headspace of the nitrification reactor is fitted with a dissolved oxygen probe. In addition, an air inlet and outlet are located on the side wall of the nitrification reactor. The figure on the left shows the Parallel Nitrification Denitrification (PND) reactor operated with independent liquor flow in each reaction vessel and the figure on the right shows the PND reactor operated with sequential flow through each vessel achieved with the use of a solenoid (D).

The PND reactor design made use of the two separated biofilm reactors (FIG. 2 A: storage driven denitrification and C: nitrification). Initially, during Phase 1, the artificial wastewater (composition given below) was added (using about 3% of the treatment time) and recycled (FIG. 3) through the storage driven denitrification biofilm to accomplish anoxic COD uptake and storage as PHB. This was accomplished by an upflow and using a small sump (B: recycle vessel) to collect the outflow from the top of the reactor.

Figure 3:
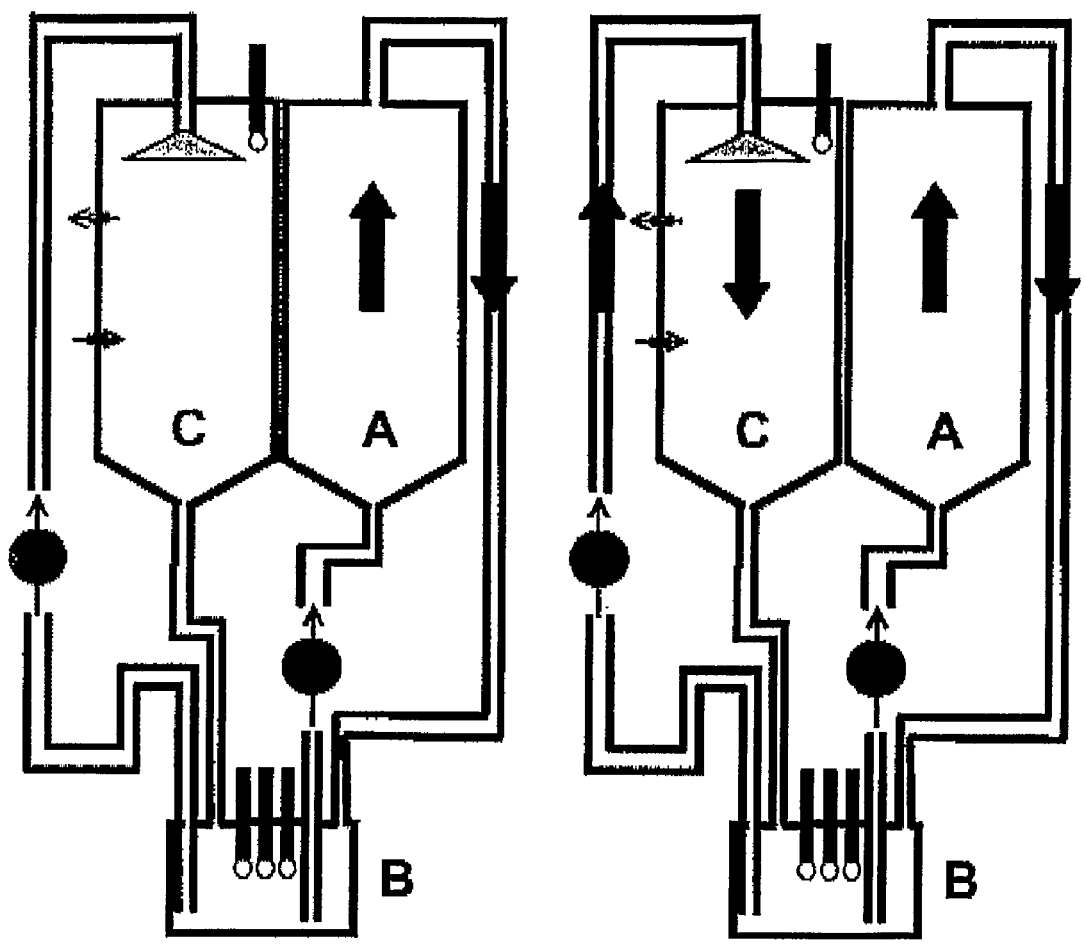
FIG. 3 is a drawing of a PND wastewater treatment system in accordance with one aspect of the present invention showing the two phases of operation of the PND reactor. In phase 1 (left hand figure), the COD and ammonia rich wastewater is circulated through the storage driven denitrification reactor (A), in the direction indicated by the bold arrows, until most or all soluble COD is removed from solution. In Phase 2 (right hand figure), the ammonia rich and COD depleted solution is circulated simultaneously through the storage driven denitrification reactor (A) and the nitrification trickling filter (C) via the recycle vessel (B) in the directions indicated by the bold arrows. When all soluble ammonia is removed from solution, the entire reactor is drained and the process initiated again. The volume of the recycle vessel (B) can be negligible, as it merely serves as a means of mixing the flows. The recycle vessel (B) can even be omitted with a direct flow from the denitrification reactor (A) to the nitrification reactor (C).

After the COD of the original synthetic wastewater was successfully stored in the storage driven denitrification reactor, the resulting COD free, ammonia containing wastewater was simultaneously recycled through the recycle vessel such that about 50% passed through the denitrification biofilm reactor while the other 50% was passed through the nitrification biofilm reactor (FIG. 3).

The nitrification reactor was operated in a downflow mode such that the biomass was exposed to oxygen containing atmosphere at all times (trickle reactor). The recycle vessel had ports for DO, pH and Eh probes and also inlets and outlets for the two reactors (FIG. 2). In addition, the nitrification trickling filter had a port for head space DO measurement and needle ports for controlled air delivery and pressure equalisation. The system was operated under parallel nitrification and storage driven denitrification until the end of the pre-determined cycle and all liquid was drained followed by a new fill cycle to the storage driven denitrification reactor. Oxygen influx was kept to a minimum in order to allow sufficient activity in the nitrification reactor without leaving an excess of oxygen in the outflow from the nitrification reactor that would flow into the denitrification reactor.

Both biomasses were grown from mixed liquor return activated sludge samples from a local wastewater treatment plant. Feed composition was altered to achieve selective population growth in the denitrification and nitrification reactors (see feed composition)

Synthetic Wastewater Composition

The synthetic wastewater solutions were all based on the work of Third, K. A., M. Newland, et al. (2003). "The effect of dissolved oxygen on PHB accumulation in activated sludge cultures." Biotechnology and Bioengineering 82(2): 238-50. Modifications were made to reduce the C/N ratio of the feed tested. The standard composition of the influent synthetic wastewater was (mg $L^{-1}$) $CH_3COONa$ 200, $NH_4Cl$ 160, $KH_2PO_4$ 44, $NaHCO_3$ 125, $MgSO_4.7H_2O$ 25, $CaCl_2.2H_2O$ 300, $FeSO_4.7H_2O$ 6.25, yeast extract 50 and 1.25 mL $L^{-1}$ of trace element solution. The autoclaved trace element solution contained (g $L^{-1}$) EDTA 15, $ZnSO_4.7H_2O$ 0.43, $CoCl_2.6H_2O$ 0.24, $MnCl_2.4H_2O$ 0.99, $CuSO_4.5H_2O$ 0.25, $(NH_4)_6Mo_7O_{24}.4H_2O$ 0.3, $NiCl_2.6H_2O$ 0.19, $NaSeO_4.10H_2O$ 0.21, $H_3BO_3$ 0.014 and $NaWO_4.2H_2O$ 0.05.

Further modifications were made to enrich the biomass in each reactor. To develop the storage driven denitrification biomass, the denitrification reactor was batch fed alternate feeds, the first as described above and the second, based on that described above, with minimal COD (i.e. no acetate and no yeast extract) and the ammonium replaced with equivalent molar concentration of nitrate. The enrichment of the nitrification biomass was achieved with a minimal COD (no acetate and no yeast extract) feed based on that described above.

Analysis

The nitrate analysis method was adapted from Third, K. A., N. Burnett, at al. (2003). "Simultaneous nitrification and denitrification using stored substrate (PHB) as the electron donor in an SBR." Biotechnology and Bioengineering 83(6): 706-720. 100 μL samples, containing 0.1 to 3 mM nitrate, were treated to remove nitrite with 40 μL saturated ammonium amidosuiphonate in deionised water and then allowed to react for 10 minutes with 300 μL 5% (w/v) sodium salicylate in 98% sulfuric acid. After addition of 3 mL ice cold 4M sodium hydroxide, mixing and, cooling, the samples were measured at 420 nm. Nitrite, ammonium, phosphate, acetate and PHB analysis were as described in Third et al. (2003). PHB was confirmed by Sudan Black staining (Lindrea, K. C., E. M. Seviour, et al. (1998). Practical methods for the examination and characterization of activated sludge. Microbiology of Activated Sludge. R. J. Seviour and L. L. Blackall. London, Chapman & Hall: 257-300). Samples for glycogen analysis were treated as described by Zeng, R. J., Z. Yuan, et al. (2003). "Enrichment of denitrifying glycogen-accumulating organisms in anaerobic/anoxic activated sludge system." Biotechnology and Bioengineering 81(4): 397-404. The supernatant was collected and measured by glucose analysis using a YSI 2700 Select Biochemistry Analyser fitted with a dextrose membrane for D-glucose analysis and/or by a specific enzymatic assay using glucose oxidase, peroxidase and ARTS (Bergmeyer, H. U. and E. Bernt (1974). Determination with Glucose Oxidase and Peroxidase. Methods of enzymatic analysis. H. U. Bergmeyer, Verlag Chemie Weinheim. 3: 1205-1215).

Calculations

The volumetric mass transfer coefficient ($k_La$) of oxygen into the vessel was determined experimentally by the operation of the reactor with inert packing material to simulate the liquid load capacity routinely in operation (Pirt, S. J. (1975), Principles of Microbe and Cell Cultivation. Melbourne, Blackwell Scientific Publications). The reactor was filled with deionised deoxygenated water and the increase in dissolved oxygen monitored. The oxygen uptake rate (OUR) of the culture was then calculated dynamically assuming steady state conditions using the concentration of oxygen in the liquid phase ($c_L$) and the saturating concentration of oxygen in the gas phase ($c_s$) as follows: $OUR=k_La.(c_s c_L)$ The observed C/N ratio of removal achieved in each cycle was calculated based on the amount of nitrate (expressed as kg N—NH$_3$) that was reduced during the denitrification phase relative to the amount of carbon (acetate; expressed as kg COD) that was removed in the acetate uptake phase:

$$C/N = \frac{acetate_{removed}(\text{kg COD})}{nitrate_{reduced}(\text{kg N} - \text{NH}_3)}$$

While the present invention has been described in detail using the case studies and embodiments shown above, they are for illustration only, and are not meant to limit the scope of the invention, which is defined by the claims appended herein. It is clear from the aforementioned examples that enormous numbers of variations and combinations are possible based on the teaching provided herein.

For example, the bacteria in FIG. 1 could be borne by fixed carriers. However, it is clear that the carriers may also be mobile carriers, or other means for creating a suitable environment for growth of the desired biomass in each of the bioreaction stages. The type of carriers and amount used are variable. Mixing may be provided by various means, either continuously or intermittently, to create the desired conditions for growth of a desired biomass to perform the desired bioreaction stage. For example, for anaerobic conditions the wastewater treatment system may be provided with mixers and mobile carriers. However, the mixers may be completely inactivated such that the carriers are completely settled at the bottom of the tank to minimize oxygen that can reach thereto.

Although the description indicates that biomass may be grown on carriers within the various bioreactors, this is not intended to preclude the presence of an activated sludge biomass that may be found in suspension. It is clear that such activated sludge also contributes to the activity of the various bioreactors described in the examples.

Whilst several types of means for generating suitable conditions in each of the reactors of the present invention, such as mixers, aerators, gas generators, heaters and cooler pumps are mentioned in above illustrations and in the claims, it is clear that such examples are for illustration only and that other such means would also fall within the scope of the claims, including the use of architectural arrangements to take advantage of physical forces such as gravity.

Example 3

In an alternative form, rather than staring newly arriving wastewater before introducing it in a single bulk amount to the first nitrifying reactor wherein it is left for a duration of time that allows storage of organic material (COD) as polymeric storage products, instead new wastewater can be fed continuously or semi-continuously into reactor one at a rate slow enough to ensure that the organic material has been removed by the denitrifying bacteria, this time not for storage as polymers for future oxidation but for immediate oxidation with nitrate or nitrite originating from the flow from denitrifying reactor two. Whilst this operation on a continuous basis may not involve storage driven denitrification, it still offers a nitrogen removal performance that is not compromised by the wasteful oxidation of COD by oxygen occurring in typical treatment systems that do not offer the clear separation of nitrifying biomass from denitrifying biomass.

Modifications of the above-described modes of carrying out the various embodiments of this invention will be apparent to those skilled in the art based on the above teachings related to the disclosed invention. The above embodiments of the invention are merely exemplary and should not be construed to be in any way limiting.

The claim defining the invention is as follows:

1. A method of treating a liquid, comprising the steps of:
   a) introducing the liquid into a first reactor comprising a first biomass;
   b) allowing the liquid to remain in the first reactor for a first period of time;
   c) allowing the liquid from step (b) to circulate from the first reactor into a second reactor comprising a second biomass and from the second reactor into the first reactor in a continuous flow;
   d) removing the liquid from the first reactor and/or the second reactor after a second period of time wherein the liquid is retained solely in the first reactor during the first period of time and wherein the flow of liquid during the second period of time is not accompanied by a corresponding flow of biomass.

2. A method according to claim 1 wherein the liquid is wastewater.

3. A wastewater treatment apparatus when used in the method of claim 1 or claim 2 comprising:
   a) a first reactor comprising a first biomass;

b) a second reactor comprising a second biomass;
c) a means for introducing wastewater into the first reactor;
d) a controllable means for allowing the wastewater from the first reactor to move into the second reactor;
e) a controllable means for allowing the wastewater from the second reactor to move into the first reactor;
f) a means for removing wastewater from the first and/or second reactor wherein the wastewater in the first reactor is in controllable communication with the wastewater in the second reactor and wherein the biomass in the first reactor is physically separated from the biomass in the second reactor.

4. A method according to claim 1 or claim 2 wherein the first and second biomasses are selected to extract at least one of carbon, sulphur, nitrogen or phosphate.

5. A method according to claim 1 or claim 2, wherein the first and second biomasses are selected to extract at least nitrogen from the liquid.

6. A method according to claim 5 wherein the first biomass is selected to either nitrify or denitrify a liquid.

7. A method according to claim 6 wherein the activity of the second biomass is the reciprocal activity of the first biomass.

8. A method according to claim 1 or claim 2 wherein the first and or second biomass is present in the reactor as a biofilm.

9. A method according to claim 2 wherein the first biomass converts organic matter in the wastewater to polymeric storage products over a first period of time.

10. A method according to claim 5, wherein the pH of the liquid in the first and or second reactor is maintained above 7.

11. A method according to claim 5, wherein the first period of time is at least 15 minutes.

12. A method according to claim 11 wherein the first time period is at least 60 minutes.

13. A method according to claim 11 wherein the first time period is at least 120 minutes or more.

14. A method according to claim 5 wherein the second time period is at least 15 minutes.

15. A method according to claim 14 wherein second time period is at least 100 minutes.

16. A method according to claim 15 wherein the second time period is at least 240 minutes.

* * * * *